(12) United States Patent
Suzuki et al.

(10) Patent No.: US 9,891,124 B2
(45) Date of Patent: Feb. 13, 2018

(54) PRESSURE SENSOR, AND MASS FLOW METER, AND MASS FLOW CONTROLLER USING SAME

(71) Applicant: Hitachi Metals, Ltd., Minato-ku, Tokyo (JP)

(72) Inventors: Kengo Suzuki, Tokyo (JP); Isao Sakaguchi, Mie (JP); Atsushi Kazama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 70 days.

(21) Appl. No.: 14/763,353

(22) PCT Filed: Apr. 15, 2014

(86) PCT No.: PCT/JP2014/060673
§ 371 (c)(1),
(2) Date: Jul. 24, 2015

(87) PCT Pub. No.: WO2014/188817
PCT Pub. Date: Nov. 27, 2014

(65) Prior Publication Data
US 2015/0362391 A1 Dec. 17, 2015

(30) Foreign Application Priority Data
May 24, 2013 (JP) ................................ 2013-109618

(51) Int. Cl.
*G01L 9/00* (2006.01)
*G01L 9/04* (2006.01)
(Continued)

(52) U.S. Cl.
CPC .............. *G01L 9/0051* (2013.01); *G01F 1/86* (2013.01); *G01L 9/0044* (2013.01);
(Continued)

(58) Field of Classification Search
CPC ..... G01L 9/00; G01L 9/02; G01L 9/04; G01L 9/06; G01L 9/0044; G01L 9/0047;
(Continued)

(56) References Cited

U.S. PATENT DOCUMENTS 5,095,755 A * 3/1992 Peterson ............. G01L 19/0038
338/3
7,093,493 B2 8/2006 Benzel et al.
(Continued)

FOREIGN PATENT DOCUMENTS

CN 1319181 A 10/2001
CN 1447096 A 10/2003
(Continued)

OTHER PUBLICATIONS

International Search Report (PCT/ISA/210) dated May 13, 2014 with English-language translation (two (2) pages).
(Continued)

*Primary Examiner* — Nguyen Ha
(74) *Attorney, Agent, or Firm* — Crowell & Moring LLP

(57) ABSTRACT

There is provided a pressure sensor which includes: a diaphragm having an inside surface facing to a fluid-tight space, the diaphragm including a diaphragm film that is part of the inside surface and deformable in response to a pressure application, and a diaphragm film support that is part of the inside surface and constitutes a periphery of the diaphragm film; a strain sensor bonded to the inside surface so as to lie partially on the periphery and having plural strain gauges thereon; and a depression formed on the inside surface, when defining an x-direction oriented from center of the inside surface to a position bonded of the strain sensor and a y-direction perpendicular to the x-direction on the inside surface, the depression extending a certain length in the y-direction, the depression being adjacent to or a certain
(Continued)

distance apart from an edge of the strain sensor in the y-direction.

19 Claims, 11 Drawing Sheets

(51) Int. Cl.
  *G01L 19/04* (2006.01)
  *G01F 1/86* (2006.01)
  *G05D 7/06* (2006.01)
(52) U.S. Cl.
  CPC .......... *G01L 9/0047* (2013.01); *G01L 9/0055* (2013.01); *G01L 19/04* (2013.01); *G05D 7/0635* (2013.01); *Y10T 137/7837* (2015.04)
(58) Field of Classification Search
  CPC ..... G01L 9/0051; G01L 9/0055; G01L 19/04; G01F 1/86; Y10T 137/7837; G05D 7/0635
  See application file for complete search history.

(56) References Cited

U.S. PATENT DOCUMENTS

| | | | | |
|---|---|---|---|---|
| 7,320,250 B2* | 1/2008 | Ueno | .................... | G01L 19/147 73/715 |
| 7,404,330 B2 | 7/2008 | Uchigashima et al. | | |
| 7,493,819 B2* | 2/2009 | Benzel | ................. | B81B 7/0006 257/415 |
| 8,884,385 B2* | 11/2014 | Nishikawa | .............. | H01L 29/84 257/415 |
| 2001/0001550 A1* | 5/2001 | Bryzek | ................. | B81B 3/0072 338/36 |
| 2001/0035052 A1 | 11/2001 | Ohmi et al. | | |
| 2003/0177837 A1 | 9/2003 | Broden et al. | | |
| 2005/0189018 A1* | 9/2005 | Brodeur | ................. | G01F 1/363 137/487.5 |
| 2010/0218614 A1* | 9/2010 | Minamitani | .......... | G01F 1/6842 73/725 |
| 2015/0033878 A1* | 2/2015 | Brida | .................... | G01L 9/0045 73/862.637 |

FOREIGN PATENT DOCUMENTS

| | | | | |
|---|---|---|---|---|
| CN | 101322020 A | | 12/2008 | |
| JP | 6-241930 A | | 9/1994 | |
| JP | 07280679 A | * | 10/1995 | ............... G01L 9/04 |
| JP | 2005-227283 A | | 8/2005 | |
| JP | 2013-11478 A | | 1/2013 | |
| JP | 5186725 B2 | | 4/2013 | |
| JP | 5186752 B2 | | 4/2013 | |
| WO | WO 2007/040962 A1 | | 4/2007 | |

OTHER PUBLICATIONS

Chinese-Language Search Report issued in counterpart Chinese Application No. 2014800061164 dated Apr. 7, 2016 with partial English translation (5 pages).

* cited by examiner

PRESSURE SENSOR, AND MASS FLOW METER, AND MASS FLOW CONTROLLER USING SAME

TECHNICAL FIELD OF THE INVENTION

The present invention relates to pressure sensors and particularly to a pressure sensor that detects a pressure by utilizing a deformation of a diaphragm caused by an application of the pressure. The invention also particularly relates to a mass flow meter and a mass flow controller using the pressure sensor of the invention.

DESCRIPTION OF BACKGROUND ART

A well-known type pressure sensor has one or more strain gauges mounted on a diaphragm by bonding or the like, and detects strains of the strain gauges caused by a deformation of the diaphragm when a pressure is applied.

The electrical resistance of such a strain gauge is changed by only a small amount of deformation. Typically, a strain sensor has a bridge circuit consisting of four strain gauges and detects pressure as a differential voltage output from the bridge circuit proportional to a pressure application. This bridge circuit can compensate temperature characteristics of the individual strain gauge. That is, when the four strain gauges have the same temperature characteristics, the deformations of the four strain gauges caused by a temperature change are the same, and therefore the strain sensor output is not changed.

When the fluid pressure to be measured is low, there are often used silicon film pressure sensors in which a part of a silicon substrate is thinned to form a silicon diaphragm (pressure sensing film) and one or more strain gauges are formed in the surface of the silicon diaphragm by an impurity diffusion. This type of sensor has a high sensitivity and can be integrated in an IC (integrated circuit).

However, this type of sensor is not suitable when the fluid pressure to be measured is high and/or the fluid is corrosive. For such high pressure and/or corrosive cases, there are often used pressure sensors that are formed by bonding one or more strain gauges (or a strain sensor having one or more strain gauges thereon) to a metal diaphragm.

Patent Literature 1 (JP 2005-227283 A) discloses a pressure sensor in which a lateral thermal expansion in a first diaphragm made of a first material is transferred to a strain gauge on a strain sensor made of a second material through a first bonding layer that bonds at least a part of the strain sensor and the first diaphragm. The first diaphragm made of the first material has a larger thermal expansion coefficient than the second material strain sensor formed in a first region. A lateral expansion in the first diaphragm caused by a temperature change is transferred to the strain gauge on the strain sensor through the first bonding layer that bonds at least a part of the first region and the first diaphragm.

Patent Literature 2 (JP 06(1994)-241930 A) discloses a semiconductor film pressure sensor comprising a diaphragm including: a diametrically extending thick beam; a thin diaphragm film (occupying the area other than the beam) and; a strain sensor formed on the thick beam. There are steps formed between the thick beam and the thin diaphragm film.

CITATION LIST

Patent Literature

Patent Literature 1: Japanese Patent Laid-open No. 2005-227283; and

Patent Literature 2: Japanese Patent Laid-open No. 06(1994)-241930.

SUMMARY OF THE INVENTION

Problems to be Solved by the Invention

The above Patent Literature 1 (JP 2005-227283 A) describes a structure for preventing breakage of the strain sensor caused by the thermal expansion coefficient difference between the strain sensor and the diaphragm. However, the disclosed structure may not improve a zero point output offset caused by the high temperature bonding of the strain sensor and a zero point output deviation caused by temperature changes during use of the sensor.

When a strain sensor having a bridge circuit is mounted at a place where the sensor is isotropically deformed by a pressure application or a temperature change, the output of the strain sensor does not change because of the compensation function of the bridge circuit. However, strain sensors need to be mounted at a place where the strain sensor is anisotropically deformed by a pressure application (where at least one of the strain gauges is deformed differently from the other strain gauges by a pressure application) in order to generate an output in response to the pressure application. Therefore, when a strain sensor is mounted on a place of a diaphragm where the diaphragm is anisotropically deformed, the strain sensor deforms by a temperature change due to the thermal expansion coefficient difference between the strain sensor and the diaphragm and the deformation is also anisotropical. Thus, the above-mentioned problem of the zero point output deviation due to a temperature change occurs.

Thus, when a pressure sensor having a conventional structure is mounted at a periphery of a thin diaphragm film, the output of the sensor is prone to change by a temperature change. One cause of this problem is that there is a large thermal expansion coefficient difference between the diaphragm made of steel and the strain sensor made of silicon (the thermal expansion coefficient of steel is more than 5 times that of silicon). Another cause of this problem is that the bonding layer between the diaphragm and the strain sensor is made of a stiff material such as Au/Sn and Au/Ge, in order to efficiently transfer a deformation of the thin diaphragm film to the strain sensor.

When the temperature of the strain sensor lowers, a compression strain is generated both in the x-direction in FIG. 2 and the y-direction in FIG. 2 (FIG. 2 will be detailed later). If the both strains are the same, the sensor output does not change. However, when the strain sensor is mounted at a thick periphery of a thin diaphragm film, the y-direction strain caused by a temperature change is larger than the x-direction strain, and as a result the sensor output changes. This is because the thin diaphragm film extends a larger region (distance) from the strain sensor in the x-direction and therefore can deform more easily in the x-direction; thus, the x-direction stress exerted on the strain sensor can be relaxed. On the other hand, the thin diaphragm film extends a smaller region (distance) from the strain sensor in the y-direction than in the x-direction and therefore can deform less easily in the y-direction; thus, the y-direction stress exerted on the strain sensor cannot be sufficiently relaxed.

Also, the diaphragm and the strain sensor are often bonded by, for example, Au/Sn eutectic bonding at a temperature higher than 280° C. Therefore, an x- and y-direction strain difference is generated after cooling the bonding, thus resulting in a zero point output offset. Such a zero point output offset is a problem because a compensation circuit for compensating the offset is needed and/or a pressure sensor having such an offset is limited in application. In addition, pressure sensors for consumer use experience a temperature change of about 100° C. and pressure sensors for vehicle use experience a temperature change of about 160° C., thus being prone to generate a zero point output offset.

The above Patent Literature 2 (JP 06(1994)-241930 A) does not particularly describe that the strain sensor is positioned at the periphery of the diaphragm, nor does it describe anything about the position of the strain sensor relative to the step. Accordingly, it would be difficult to extract a solution to the above problems from JP 06(1994)-241930 A.

In view of the foregoing, it is an objective of the present invention to provide a pressure sensor in which the zero-point output offset of a strain sensor of the pressure sensor as well as the zero-point output deviation caused by a temperature change are suppressed. Another objective is to provide a mass flow meter and a mass flow controller using the pressure sensor of the invention.

Solution to Problems (I) According to one aspect of the present invention, there is provided a pressure sensor which includes:

a diaphragm made of a first material and having an inside surface facing to a fluid-tight space, the diaphragm including a diaphragm film deformable in response to a pressure application, the diaphragm film having an inside surface that is part of the inside surface of the diaphragm, and a diaphragm film support having an inside surface that is part of the inside surface of the diaphragm and constitutes a periphery of the inside surface of the diaphragm film;

a strain sensor bonded to the inside surface of the diaphragm by a bonding material such that a part of the strain sensor lies on the inside surface of the diaphragm film support, the strain sensor being made of a second material;

a plurality of strain gauges provided on the strain sensor; and a depression formed on the inside surface of the diaphragm, when defining a direction oriented from center of the inside surface of the diaphragm to a position bonded of the strain sensor as an x-direction and another direction perpendicular to the x-direction on the inside surface of the diaphragm as a y-direction, the depression extending a certain length in the y-direction, the depression being adjacent to or a certain distance apart from an edge of the strain sensor in the y-direction.

(II) According to another aspect of the invention, there is provided a built-in mass flow meter to monitor a fluid pressure using the pressure sensor of the invention.

(III) According to still another aspect of the invention, there is provided a built-in mass flow controller to monitor and control a flow of a fluid using the pressure sensor of the invention.

Advantages of the Invention

According to the present invention, it is possible to provide a pressure sensor in which the zero-point output offset of a strain sensor of the pressure sensor as well as the zero-point output deviation caused by a temperature change are suppressed. Also possible is to provide a mass flow meter and a mass flow controller using the pressure sensor of the invention.

DETAILED DESCRIPTION OF THE PREFERRED EMBODIMENTS

Figure 1:
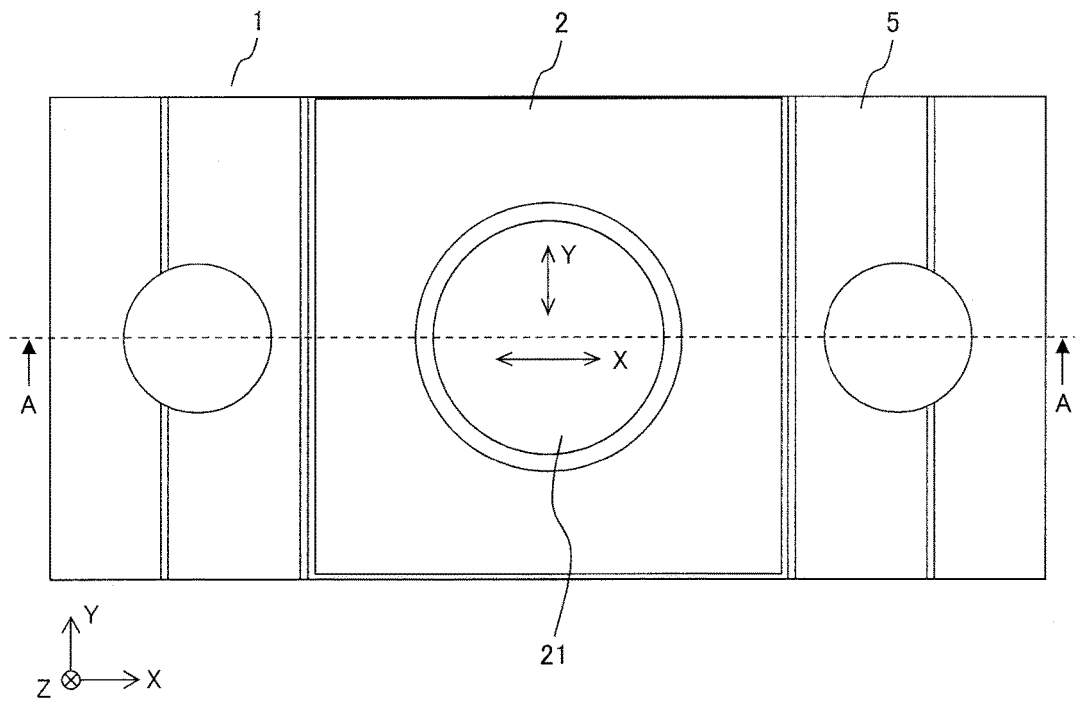
FIG. 1 is a schematic illustration showing a plan view of an exemplary pressure sensor according to Embodiment 1 of the present invention.

A pressure sensor according to the present invention will be described below by way of examples and with reference to the accompanying drawings. The below-described embodiments of the pressure sensor of the invention will hereinafter be described using, as an example, an absolute pressure sensor having a strain sensor. Also, in the below-described embodiments, like parts are designated by like reference numerals without repeating the description thereof.

Embodiment 1

Figure 2:
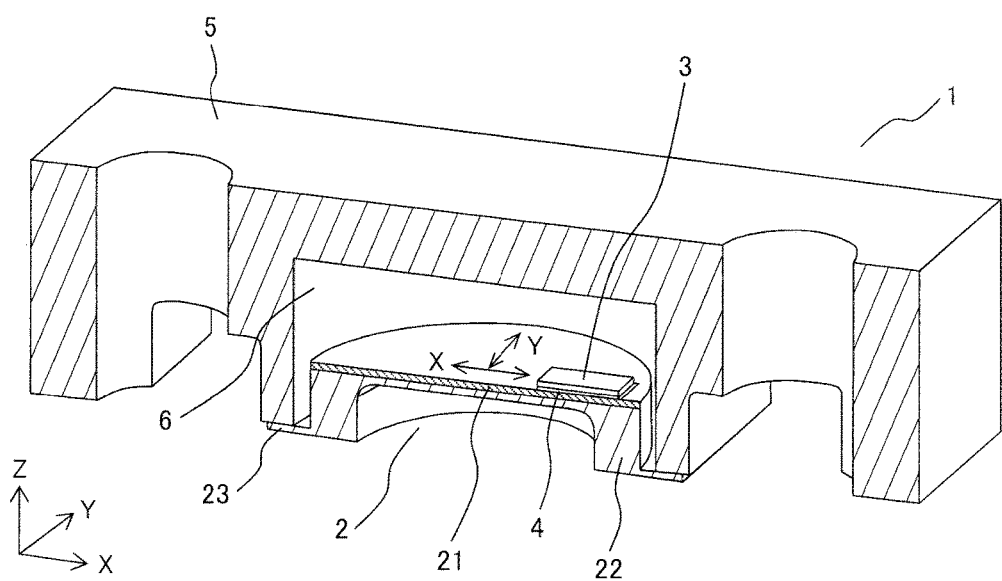
FIG. 2 is a schematic illustration showing a perspective view of the pressure sensor shown in FIG. 1 including a cross-sectional view cut along A-A line in FIG. 1.

First, the overall configuration of a pressure sensor of the invention is explained by referring to FIGS. 1 and 2.

As shown in FIGS. 1 and 2, a pressure sensor 1 of the invention generally includes: a fluid-tight housing 5; a fluid-tight space 6 in a central region of the fluid-tight housing 5; a diaphragm 2 disposed into the central region to make the fluid-tight space 6; and a strain sensor 3 bonded onto the diaphragm 2 via a bonding layer 4 disposed between the diaphragm 2 and the strain sensor 3.

The diaphragm 2 includes: a diaphragm film 21; a diaphragm film support 22 for supporting the diaphragm film 21; a flange 23 for securing the diaphragm film support 22 to the fluid-tight housing 5; and a later-described depression (not shown in FIGS. 1 and 2) formed on a surface of the diaphragm film 21.

The diaphragm 2 is made of a first material (for example, a metal such as a high corrosion resistant steel). Also, the diaphragm 2 is cylindrical (operculate cylindrical or bottomed cylindrical) in shape. The diaphragm film 21 may be formed by thinning a central portion of a solid column, or disposing a film on one end of a hollow cylinder. The film forming method includes, e.g., cutting, pressing and diffusion bonding.

The periphery of the diaphragm film 21 is provided with a fillet in order to relax stress concentration caused by a pressure application or a temperature change. The diaphragm film 21 deforms in response to a pressure applied from a surface opposite the strain sensor 3 and causes the strain sensor 3 to be strained in an amount proportional to the pressure applied. On the other hand, the diaphragm film support 22 is thicker than the diaphragm film 21, and is therefore less deformable by the pressure applied. The flange 23 is provided for fixing the diaphragm film support 22 to the fluid-tight housing 5, and have a sufficient thickness and width to enable the fixing by resistive welding or laser welding.

Figure 3:
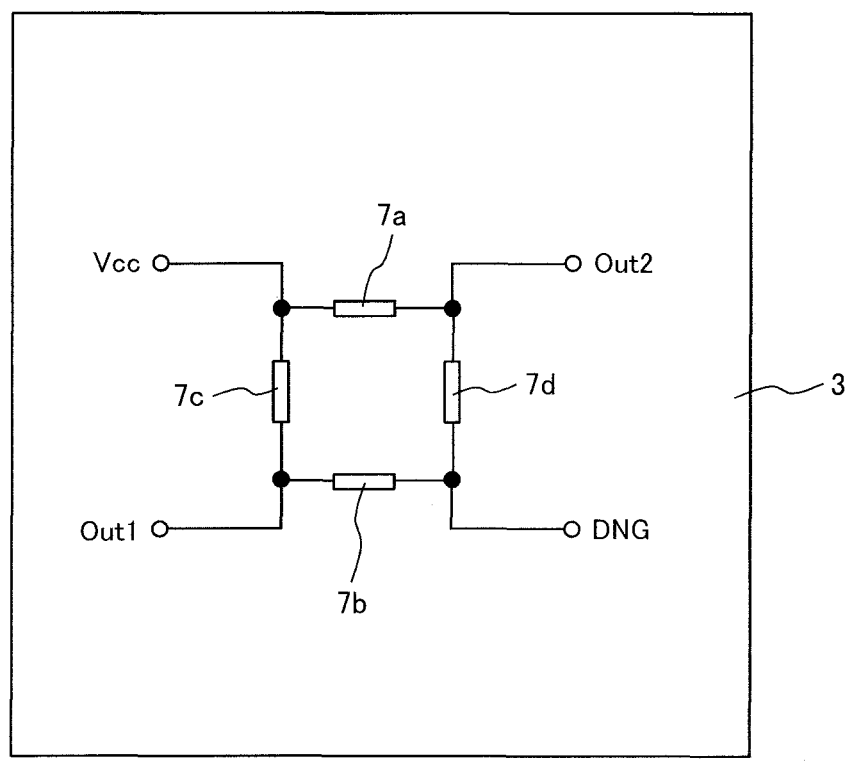
FIG. 3 is a schematic illustration showing a plan view of an exemplary strain sensor to be used in a pressure sensor of the invention including a bridge circuit consisting of four strain gauges.
Figure 3:
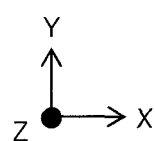

Next, the strain sensor 3 is explained by reference to FIGS. 1 to 3. As shown in FIG. 3, the strain sensor 3 has, on a central region of its surface, a bridge circuit consisting of four strain gauges 7a, 7b, 7c and 7d. The strain sensor 3 is made of a second material (such as silicon) that is different in linear expansion coefficient from the first material of the diaphragm 2. The four strain gauges 7a, 7b, 7c and 7d are formed by, for example, an impurity diffusion into a silicon substrate. The strain gauges 7a and 7b are disposed in such a manner that current flows through them in a direction extending from the center of the top surface of the diaphragm 2 to a position bonded of the strain sensor 3 as shown in FIG. 2 (hereinafter, x-direction).

The strain gauges 7c and 7d are disposed in such a manner that current flows through them in a direction perpendicular to the x-direction in the diaphragm 2 top surface shown in FIG. 2 (hereinafter, y-direction). The strain sensor 3 produces an output (a differential output between the two midpoint voltages of the bridge circuit) proportional to the difference between a strain in the x-direction and a strain in the y-direction. Furthermore, when the gauge factors of the all four strain gauges 7a, 7b, 7c and 7d have the same temperature characteristic, a temperature change causes the all four strain gauges to give the same resistance change. Therefore, the temperature characteristic of the strain gauge can be canceled out by the bridge circuit.

The cylindrical diaphragm 2 deforms axially symmetrical in response to a pressure applied. Therefore, if the strain sensor 3 is positioned at the center of the diaphragm 2, no difference is obtained between the strains in the x- and y-directions when a pressure is applied. Accordingly, it is preferable to position the strain sensor 3 of the invention around a periphery of the diaphragm film 21 in order to enhance the sensitivity. In other words, the strain sensor 3 is positioned so as to lie partially on the diaphragm film support 22. When the strain sensor 3 is positioned around a periphery of the diaphragm film 21, a compressive strain and a tensile strain occur in the x- and y-directions respectively, thus obtaining a large strain difference. As a result, according to the invention, the sensitivity of the pressure sensor 1 can be improved.

The strain sensor 3 are securely bonded to the diaphragm 2 via a bonding layer 4. For example, a metal bonding layer or a glass bonding layer can be used for bonding the strain sensor 3 to the diaphragm 2; thereby, creep deformation caused by long term exposure to high temperatures and/or long term pressure application can be suppressed. Furthermore, a metal bonding layer has adequate rigidity; therefore a strain generated in the diaphragm film 21 can be efficiently transferred to the strain sensor 3.

For example, an Au/Sn (gold/tin) or Au/Ge (gold/germanium) eutectic bonding can be used as the above-mentioned metal bonding layer. These eutectic bondings are formed at temperatures above 280° C. Also, a low melting-point vanadium-based glass (V-glass) can be used as the glass bonding layer. The V-glass bonding is formed at temperatures above 370° C.

The fluid-tight housing 5 covers the diaphragm 2, the strain sensor 3 and the other members, and is secured with the flange 23 of the diaphragm 2 so as to maintain the fluid-tight space 6 facing the diaphragm film 21 at a constant pressure (e.g., vacuum). The flange 23 may be fixed to the fluid-tight housing 5 by any method that can maintain the fluid tightness therebetween (for example, a resistance welding and a laser welding). This fluid tightness allows the pressure sensor 1 to be unaffected by any other unwanted pressure change than the pressure to be measured and to operate as an absolute pressure sensor.

The fluid-tight housing 5 may be provided with threaded screw holes in order to bolt the pressure sensor 1 to a desired device. The screw holes are preferably positioned sufficiently away from the diaphragm 2 in order to prevent a screwing operation from causing an undesirable stress in the fluid-tight housing 5 and having an adverse effect on the measurement accuracy of the strain sensor 3.

In addition, the pressure sensor 1 may be provided with unshown electrodes (signal lines) from which the outputs of the strain sensor 3 can be read out. The electrodes can be extended out, for example, through a hole penetrating through the wall of the fluid-tight housing 5 and communicating between the fluid-tight space 6 and the exterior while electrically insulating the electrodes from each other and from the inner wall of the hole. Here, the unshown electrodes extending from the hole end to the strain sensor 3 through the fluid-tight space 6 are preferably formed of an electrical conducting flexible material (not shown) (such as a flexible flat cable). Thus, even when the diaphragm film 21 and the strain sensor 3 bonded thereto displace in response to a pressure change, the electrodes and the strain sensor 3 can be electrically connected stably.

Figure 4:
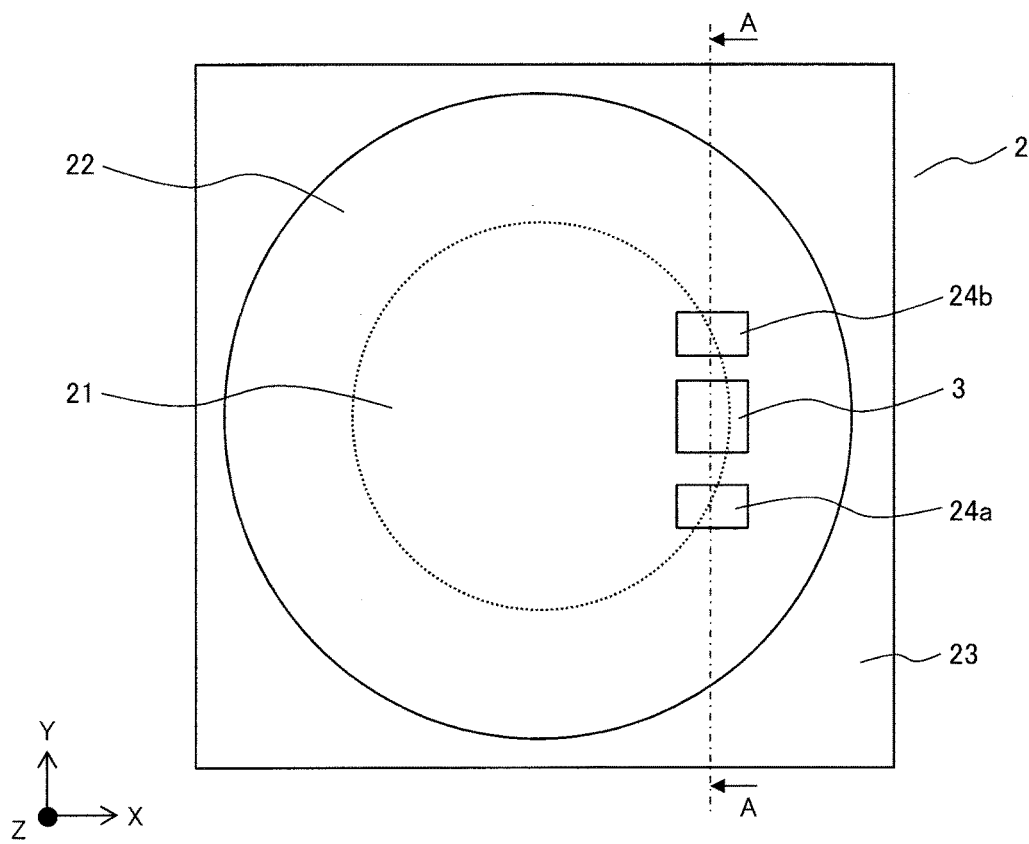
FIG. 4 is a schematic illustration showing a plan view of an exemplary diaphragm including a strain sensor according to Embodiment 1 of the invention.

Next, depression 24 (24*a* and 24*b*) formed on the surface of the diaphragm film 21 is explained with reference to FIGS. 4 and 5. The broken line in FIG. 4 is a hidden line for showing the outline of the diaphragm film 21 (the broken lines in the figures of all the remaining Embodiments represent the same).

The diaphragm 2 of Embodiment 1 is configured so as to allow the diaphragm 2 to easily deform in the y-direction and reduce the y-direction compression strain exerted on the strain sensor 3. As already defined, the x-direction extends from the center of the top surface the diaphragm 2 toward a position bonded of the strain sensor 3; the y-direction is perpendicular to the x-direction in the top surface of the diaphragm 2. Depressions 24*a* and 24*b* are formed on the top surface of the diaphragm 2 (including the diaphragm film 21). The depressions 24*a* and 24*b* are formed very near or a certain distance (forgiving a mounting misalignment or a machining error) apart from an edge of the strain sensor 3 in the y-direction. In addition, the depressions 24*a* and 24*b* overlap with at least a part of the diaphragm film 21. That is, in Embodiment 1 shown in FIGS. 4 and 5, two regions of the surface of the diaphragm 2 are depressed (thinned) to form the depressions 24*a* and 24*b* that sandwich the strain sensor 3 along the y-direction.

These depressions 24*a* and 24*b* allow the diaphragm film 21 to easily deform in the y-direction, and thus, reduces the y-direction compressive strain exerted on the strain sensor 3. As a result, the difference between the x- and y-direction strains exerted on the strain sensor 3 can be reduced, thus suppressing a zero-point output deviation of the strain sensor 3 caused by a temperature change.

The depressions 24*a* and 24*b* do not penetrate the diaphragm film 21 and have a constant depth throughout the depressions. The depressions 24*a* and 24*b* have an x-direction length of almost the same as the strain sensor 3, and are oriented parallel to the strain sensor 3 in the x-direction without misorientation. In other words, each of the depressions 24*a* and 24*b* is disposed at almost the same position in the x-direction as the strain sensor 3. In the y-direction, the depressions 24*a* and 24*b* extend a certain (relatively short) length from a position very near an edge of the strain sensor 3 or a gap spaced apart from the edge of the strain sensor 3, but do not reach a perimeter of the top surface of the diaphragm 2. The depressions 24*a* and 24*b* overlap with at least a part of the diaphragm film 21.

Thanks to the presence of the depressions 24*a* and 24*b* (which are formed by digging down (thinning) a part of the top surface of the diaphragm 2 extending in the y-direction from a position near the strain sensor 3), the diaphragm film 21 can easily deform in the y-direction in response to a y-direction compression stress caused by a temperature change. Therefore, the y-direction strain exerted on the strain sensor 3 can be decreased. As a result, the difference between the x- and y-direction strains on the surface of the strain sensor 3 can be decreased, thus suppressing the zero-point output deviation of the strain sensor 3 caused by a temperature change.

In this Embodiment, because the depressions 24*a* and 24*b* are provided at only positions adjacent to the strain sensor 3, amount of the overall deformation of the diaphragm film 21 caused by a pressure application becomes almost the same compared with the case without the depressions 24*a* and 24*b*, and therefore the stress concentration to the diaphragm film 21 caused by a pressure application can be suppressed to a level comparable to the case without the depressions 24*a* and 24*b*. Thus, the zero-point output deviation caused by a temperature change can be suppressed without breakage of the diaphragm 2 caused by the deformation associated with a pressure application.

The depressions 24*a* and 24*b* are formed to be spaced a little in the y-direction from the strain sensor 3. In other words, the strain sensor 3 can be mounted easily so as not to overlap with the depressions 24*a* and 24*b*. Thus, a sufficient bonding area of the strain sensor 3 can be obtained. Also, creep deformation of the bonding layer 4 caused by stress concentrations at edges (steps) of the depressions 24*a* and 24*b* can be prevented.

The above-described pressure sensor 1 of Embodiment 1 improves the zero point output offset of the strain sensor 3 as well as the zero point output deviation due to a temperature change. More specifically, according to the Embodiment 1 pressure sensor 1, the depressions 24*a* and 24*b* are formed by depressing (thinning) some areas of the top surface of the diaphragm 2, thereby suppressing the zero point output offset of the strain sensor 3 due to a residual thermal strain in the strain sensor 3 after the mounting of the strain sensor 3 as well as the zero point output deviation due to a temperature change during use of the sensor. Even when an inexpensive material having a different thermal expansion coefficient from the strain sensor 3 is used as the material of the diaphragm 2 in order to reduce the cost thereof, the zero point output offset of the strain sensor 3 as well as the temperature characteristic of the strain sensor 3 (the zero point output deviation due to temperature changes during use) can be suppressed.

Embodiment 2

Figure 6:
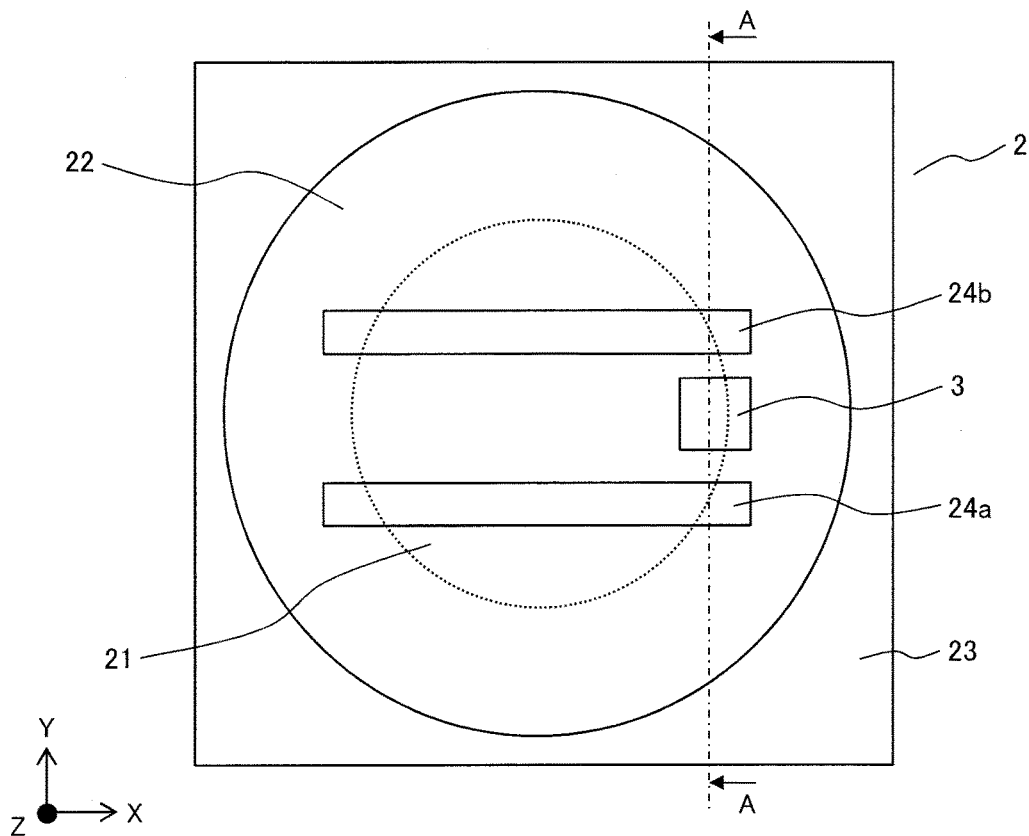
FIG. 6 is a schematic illustration showing a plan view of an exemplary diaphragm including a strain sensor according to Embodiment 2 of the invention.
Figure 7:
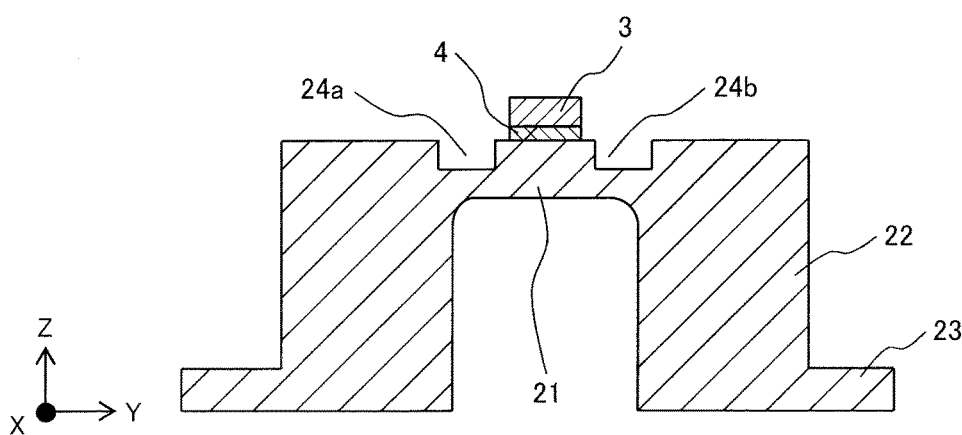
FIG. 7 is a schematic illustration showing a cross-sectional view of the diaphragm shown in FIG. 6 cut along A-A chain line.

FIGS. 6 and 7 are schematic illustrations showing a pressure sensor of Embodiment 2 of the invention. Embodiment 2 will be described with reference to only differences from Embodiment 1.

In Embodiment 2 shown in FIGS. 6 and 7, unlike Embodiment 1, the depressions 24*a* and 24*b* are elongated grooves that do not penetrate the diaphragm film 21 and that have a constant depth throughout the depressions. That is, the x-direction length of the groove depressions 24*a* and 24*b* is longer than that of the strain sensor 3. The groove depressions 24*a* and 24*b* extend, in the x-direction, from a position of an outer edge of the strain sensor 3 (i.e., the same x-direction position as an outward edge of the strain sensor 3) to a position on the opposite side of the x-direction across a central region of the top surface of the diaphragm 2. As a matter of course, the groove depressions 24*a* and 24*b* overlap with at least a part of the diaphragm film 21. The groove depressions 24*a* and 24*b* are provided in only a part of the top surface of the diaphragm film support 22. This is because the diaphragm film support 22 is much thicker than the diaphragm film 21, and is therefore less deformable. Hence, a depression formed on the top surface of the diaphragm film support 22 has less effect of relaxing compression strains.

In the y-direction, the groove depressions 24*a* and 24*b* extend a relatively small length from a position adjacent to or a certain distance apart from an edge of the strain sensor 3 in the y-direction. That is, each of the grooves has a relatively small width. In other words, each of the grooves does not extend to an outer perimeter in the y-direction of the top surface of the diaphragm 2.

This Embodiment 2 structure also provides positive effects similar to Embodiment 1.

More specifically, the groove depressions 24a and 24b (which are formed by thinning (digging down) a surface region of the diaphragm 2 extending a relatively short length in the y-direction from a position near the strain sensor 3) allow the diaphragm film 21 to easily deform in the y-direction in response to a y-direction compression stress caused by a temperature change, therefore, the y-direction compression strain exerted on the strain sensor 3 can be decreased. As a result, the difference between the x- and y-direction strains can be decreased, thus suppressing the zero-point output deviation of the strain sensor 3 caused by a temperature change. The groove depressions 24a and 24b of Embodiment 2 are larger in area than those of Embodiment 1, and therefore the diaphragm film 21 can be more easily deformed in the y-direction, thus being more effective in relaxing y-direction compression strains exerted on the strain sensor 3.

Embodiment 3

Figure 8:
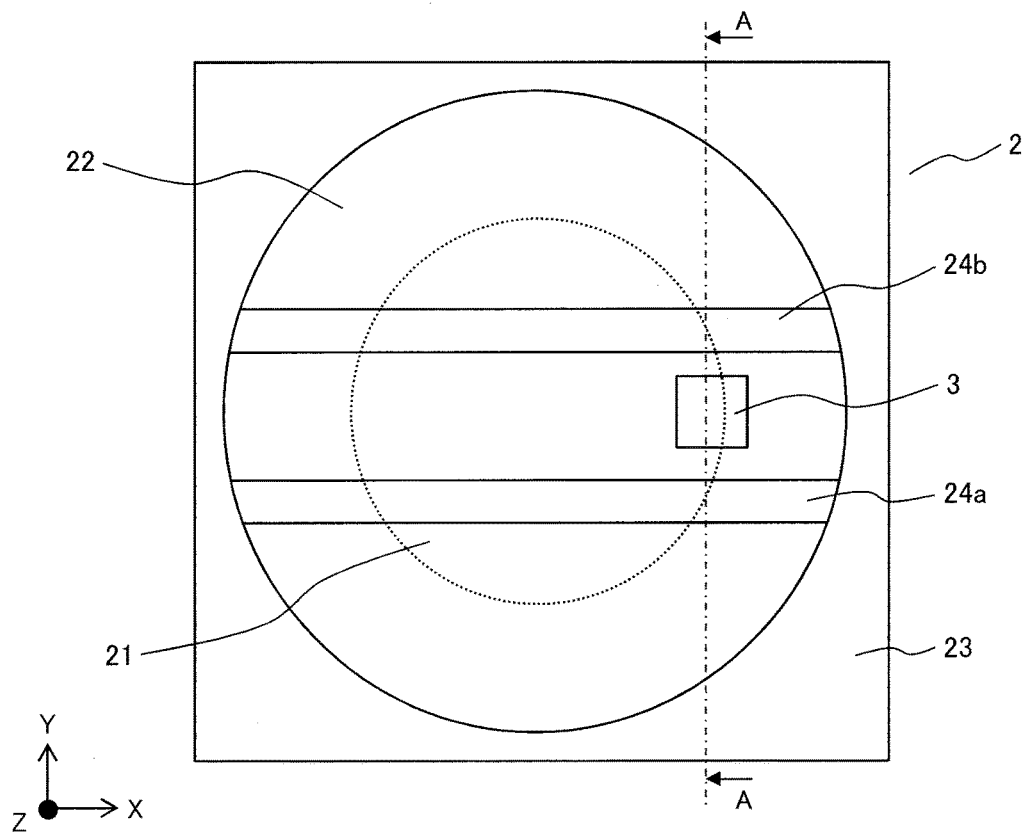
FIG. 8 is a schematic illustration showing a plan view of an exemplary diaphragm including a strain sensor according to Embodiment 3 of the invention.
Figure 9:
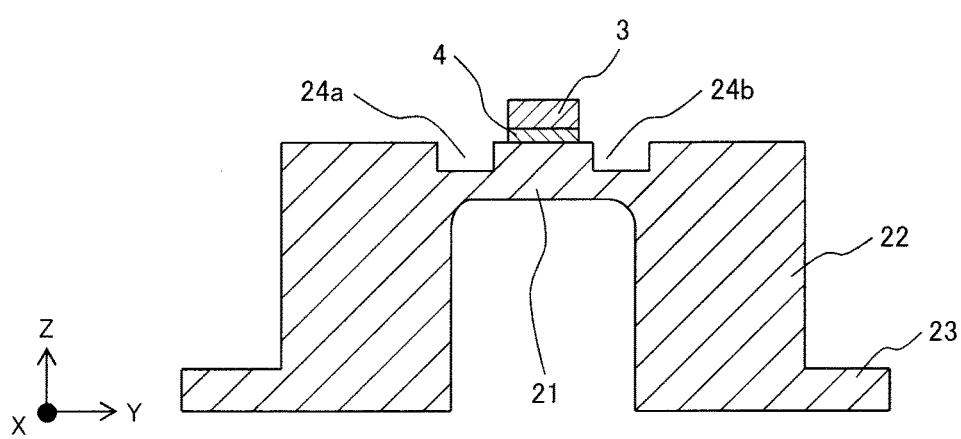
FIG. 9 is a schematic illustration showing a cross-sectional view of the diaphragm shown in FIG. 8 cut along A-A chain line.

FIGS. 8 and 9 are schematic illustrations showing a pressure sensor of Embodiment 3 of the invention. Embodiment 3 will be described with reference to main differences from Embodiment 2.

In Embodiment 3, similarly to Embodiment 2, the depressions 24a and 24b are elongated grooves that do not penetrate the diaphragm film 21 and that have a constant depth throughout the depressions. However, the groove depressions 24a and 24b of Embodiment 3 extend an entire span of the diaphragm 2 in the x-direction (extend, in the x-direction, from an edge along the perimeter of the diaphragm 2 to the corresponding opposite edge along the perimeter). That is, the groove depressions 24a and 24b overlap with at least a part of the diaphragm film 21. In the y-direction from the strain sensor 3, the groove depressions 24a and 24b extend a relatively small length from a position adjacent to or a certain distance apart from an edge of the strain sensor 3 in the y-direction, which means that each of the grooves has a relatively small width. In other words, each of the grooves does not reach an outer perimeter in the y-direction of the diaphragm 2.

This Embodiment 3 structure provides positive effects similar to Embodiment 2. Also, because the Embodiment 3 groove depressions 24a and 24b extend an entire span of the diaphragm 2, the depressions can be easily machined using a milling machine or the like after the formation of the diaphragm film 21, thus leading to low cost.

Similarly to Embodiment 2, by the effect of the groove depressions 24a and 24b (which are formed by thinning (scraping off) a surface region of the diaphragm 2 extending from the strain sensor 3 a relatively short length in the y-direction from a position near the strain sensor 3), the diaphragm film 21 can be easily deformed in the y-direction in response to a y-direction compression stress caused by a temperature change; therefore, the y-direction compression strain exerted on the strain sensor 3 can be decreased. As a result, the difference between the x- and y-direction strains can be decreased, thus suppressing the zero-point output deviation caused by a temperature change. The groove depressions 24a and 24b of Embodiment 3 are larger in area than those of Embodiment 1, and therefore the diaphragm film 21 can be more easily deformed in the y-direction than that of Embodiment 1, thus being more effective in relaxing y-direction compression strains exerted on the strain sensor 3.

Embodiment 4

Figure 10:
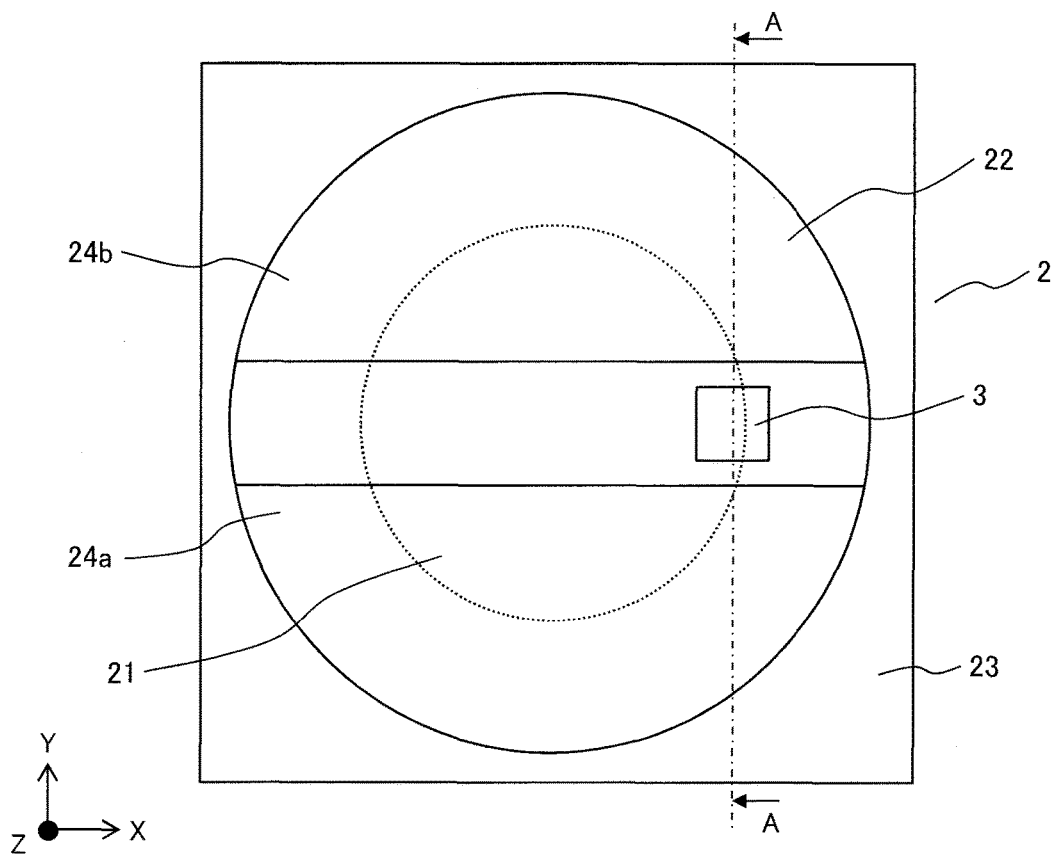
FIG. 10 is a schematic illustration showing a plan view of an exemplary diaphragm including a strain sensor according to Embodiment 4 of the invention.
Figure 11:
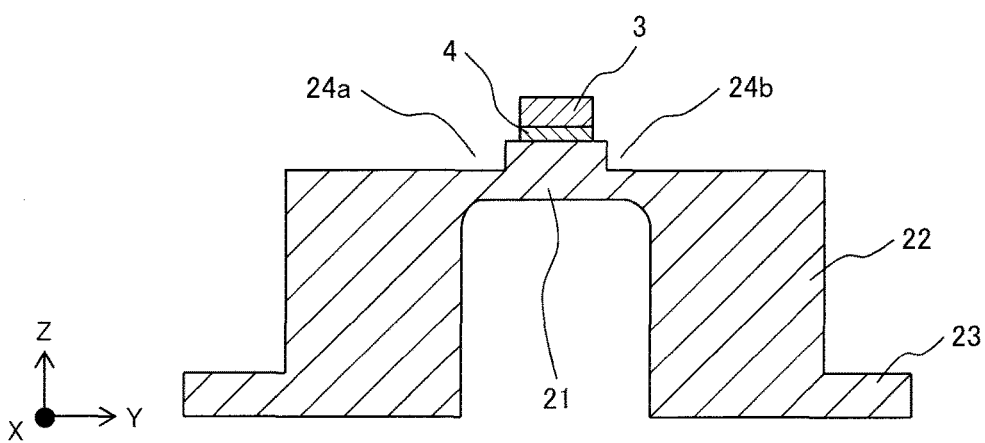
FIG. 11 is a schematic illustration showing a cross-sectional view of the diaphragm shown in FIG. 10 cut along A-A chain line.

FIGS. 10 and 11 are schematic illustrations showing a pressure sensor of Embodiment 4 of the invention. Embodiment 4 will be described with reference to main differences from Embodiment 3.

In Embodiment 4, unlike Embodiment 3, the depressions 24a and 24b are approximate (semi) half circle depressions that do not penetrate the diaphragm film 21 and have a constant depth throughout the depressions. The approximate half circle depressions 24a and 24b extend, in the x-direction, from an approximate quarter perimeter of the diaphragm 2 to the corresponding opposite approximate quarter perimeter of the diaphragm 2 (that is, occupy an approximate half circle of the diaphragm 2). In the y-direction from the strain sensor 3, the approximate half circle depressions 24a and 24b of Embodiment 4 extend from a position adjacent to or a certain distance apart from the strain sensor 3 to an approximate half perimeter of the diaphragm 2. In other words, the depressions 24a and 24b of Embodiment 4 divergently extend (180°) to the approximate half perimeter (see FIG. 10).

This structure provides positive effects similar to Embodiment 3.

The approximate half circle depressions 24a and 24b (which are formed by thinning (cutting off) an approximate half circle surface region of the diaphragm 2 extending in the y-direction from a position near the strain sensor 3) allow the diaphragm film 21 to easily deform in the y-direction in response to a y-direction compression stress caused by a temperature change. Therefore, the y-direction compression strain exerted on the strain sensor 3 can be decreased. As a result, the difference between the x- and y-direction strains in the strain sensor 3 can be decreased, thus suppressing the zero-point output deviation of the strain sensor 3 caused by a temperature change. The approximate half circle depressions 24a and 24b of Embodiment 4 are larger in area than those of Embodiments 1 to 3 and therefore the diaphragm film 21 can be more easily deformed than that of Embodiments 1 to 3, thus being more effective in relaxing y-direction compression strains exerted on the strain sensor 3. In some cases, a y-direction compression strain may be larger than an x-direction strain even adopting any one of the pressure sensor structures of Embodiments 1 to 3. The pressure sensor having Embodiment 4 structure can suppress the zero-point output deviation even for such a large y-direction compression strain.

Embodiment 5

Figure 12:
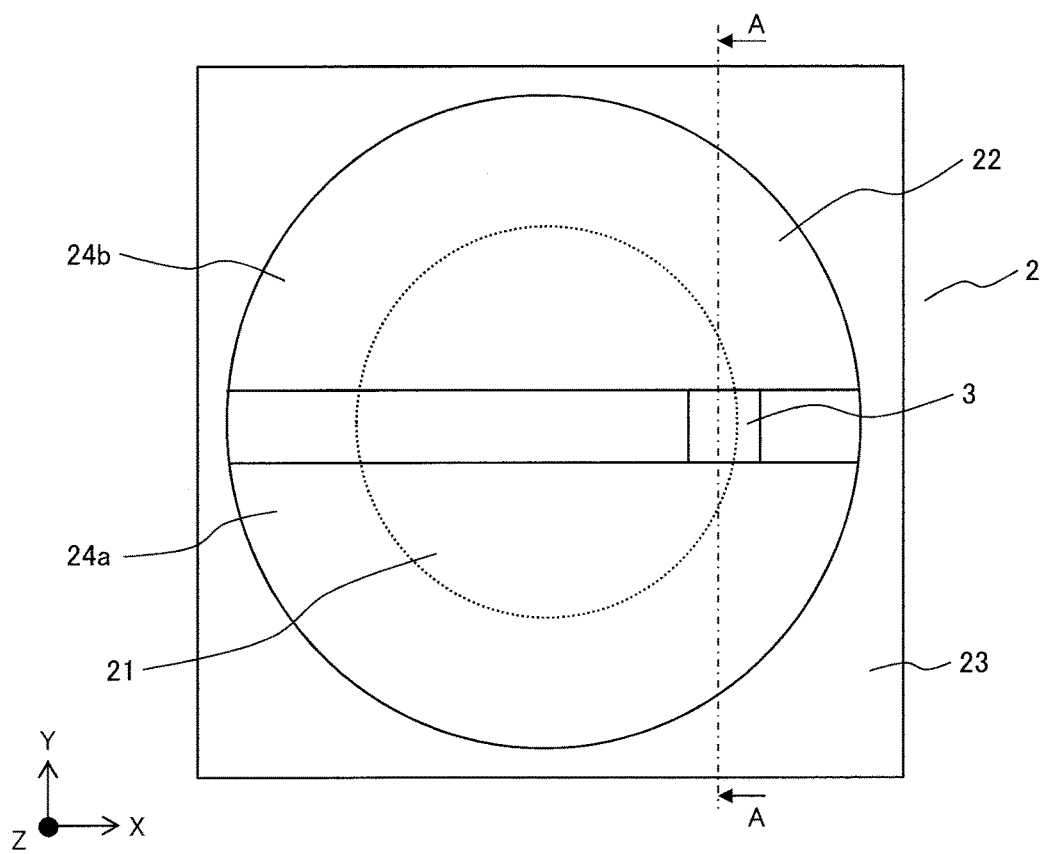
FIG. 12 is a schematic illustration showing a plan view of an exemplary diaphragm including a strain sensor according to Embodiment 5 of the invention.
Figure 13:
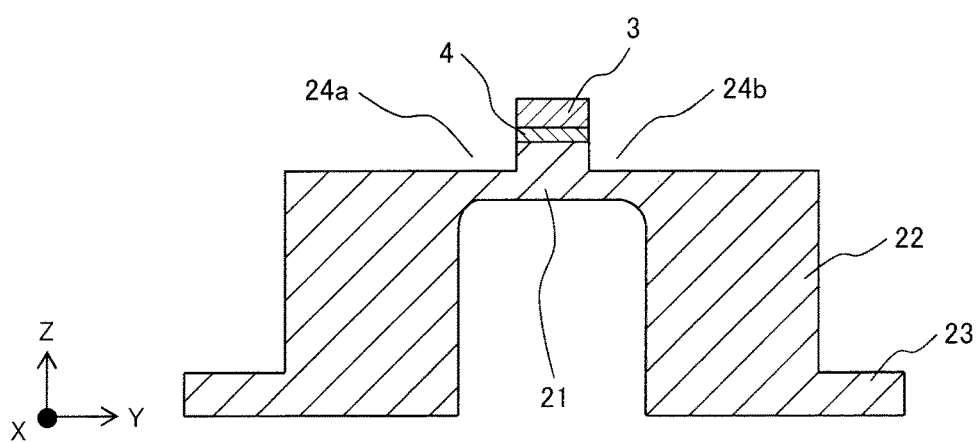
FIG. 13 is a schematic illustration showing a cross-sectional view of the diaphragm shown in FIG. 12 cut along A-A chain line.

FIGS. 12 and 13 are schematic illustrations showing a pressure sensor of Embodiment 5 of the invention. Embodiment 5 will be described with reference to main differences from Embodiment 4.

In Embodiment 5 shown in FIGS. 12 and 13, like Embodiment 4, the depressions 24a and 24b are approximate half circle depressions that do not penetrate the diaphragm film 21 and have a constant depth throughout the depressions. The approximate half circle depressions 24a and 24b of Embodiment 5 extend, in the x-direction, from an approximate quarter perimeter of the diaphragm 2 to the corresponding opposite approximate quarter perimeter of the diaphragm 2 (that is, occupy an approximate half circle of the diaphragm 2). Unlike Embodiment 4, the approximate half circle depressions 24a and 24b of Embodiment 5 and the strain sensor 3 are just adjacent to (or almost touching) each other in the y-direction.

The approximate half circle depressions 24a and 24b of Embodiment 5 structure also provide positive effects similar to Embodiment 4. In addition, the depressions 24a and 24b just adjacent to the position on which the strain sensor 3 is to be mounted can be used as an alignment marker. Thus, the strain sensor 3 can be easily positioned (aligned) when mounting.

Thanks to the presence of the approximate half circle depressions 24a and 24b (which are formed by thinning (cutting off) an approximate half circle surface region of the diaphragm 2 just adjacent to the strain sensor 3), the diaphragm film 21 can be easily deformed in the y-direction in response to a y-direction compression stress caused by a temperature change. Therefore, the y-direction compression strain exerted on the strain sensor 3 can be decreased. As a result, the difference between the x- and y-direction strains can be decreased, thus suppressing the zero-point output deviation of the strain sensor 3 caused by a temperature change. The approximate half circle depressions 24a and 24b of Embodiment 5 are larger in area than those of Embodiments 1 to 3 and therefore the diaphragm film 21 of Embodiment 5 can be more easily deformed than those of Embodiments 1 to 3, thus being more effective in relaxing y-direction compression strains exerted on the strain sensor 3. In some cases, a y-direction compression strain may be larger than an x-direction strain even adopting any one of the pressure sensor structures of Embodiments 1 to 3. The pressure sensor having Embodiment 5 structure can suppress the zero-point output deviation even for such a large y-direction compression strain.

Embodiment 6

Figure 14:
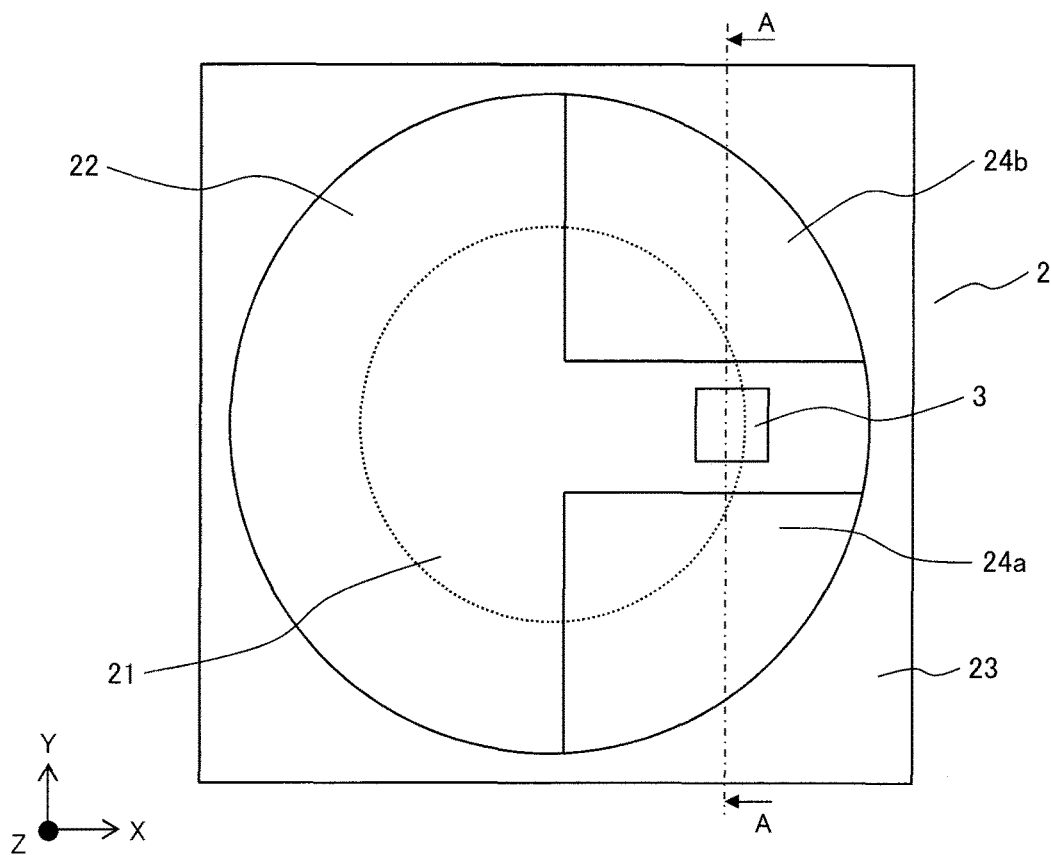
FIG. 14 is a schematic illustration showing a plan view of an exemplary diaphragm including a strain sensor according to Embodiment 6 of the invention.
Figure 15:
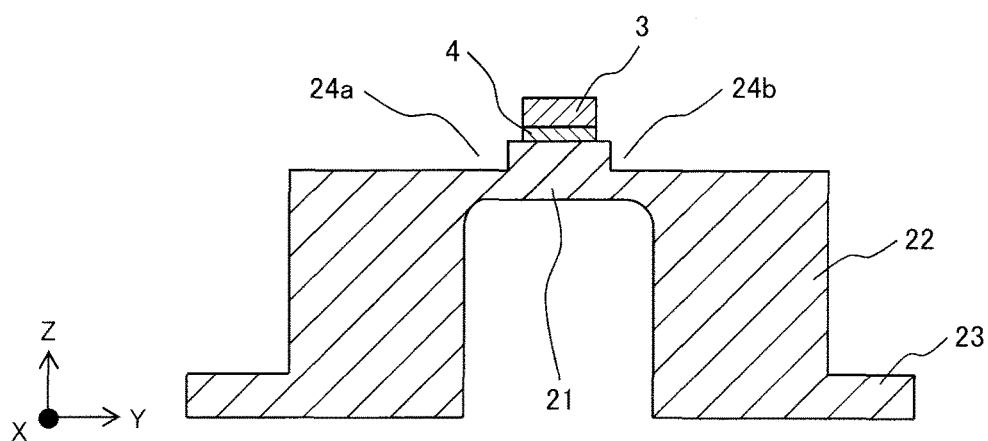
FIG. 15 is a schematic illustration showing a cross-sectional view of the diaphragm shown in FIG. 14 cut along A-A chain line.

FIGS. 14 and 15 are schematic illustrations showing a pressure sensor of Embodiment 6 of the invention. Embodiment 6 will be described with reference to main differences from Embodiment 4.

In Embodiment 6 shown in FIGS. 14 and 15, unlike Embodiment 4, the depressions 24a and 24b are approximate quarter circle depressions that do not penetrate the diaphragm film 21 and have a constant depth throughout the depressions. As can be seen from FIG. 14, the approximate quarter circle depressions 24a and 24b extend, in the x-direction, from a central region of the diaphragm 2 to an outer perimeter of the diaphragm 2 on the side of the strain sensor 3. That is, the depressions 24a and 24b overlap with at least a part of the diaphragm film 21. In the y-direction, the approximate quarter circle depressions 24a and 24b extend from a position very near or a short distance apart from the strain sensor 3 to an outer perimeter of the diaphragm 2 and the approximate quarter perimeter (therefore occupy an approximate quarter circle of the diaphragm 2 on the side of the strain sensor 3).

This Embodiment 6 structure also provides positive effects similar to Embodiment 4.

By the effect of the approximate quarter circle depressions 24a and 24b (which are formed by thinning (cutting off) an approximate quarter circle surface of the diaphragm 2 near the strain sensor 3), the diaphragm film 21 can be easily deformed (compressed) in the y-direction in response to a y-direction compression stress caused by a temperature change. Therefore, the y-direction strain exerted on the strain sensor 3 can be decreased. As a result, the difference between the x- and y-direction strains can be decreased, thus suppressing the zero-point output deviation of the strain sensor 3 caused by a temperature change.

If the approximate quarter circle depressions 24a and 24b are not provided, stresses caused by a stress application are prone to be concentrated at edges along the perimeter of the diaphragm film 21 on the side opposite of the strain sensor 3 across the central region of the diaphragm film 21 (i.e., left side edges of the diaphragm film 21 in FIG. 14). This is because the deformation of the diaphragm film 21 around the strain sensor 3 is slightly suppressed by the existence of the strain sensor 3. In Embodiment 6, the approximate quarter circle depressions 24a and 24b are provided in the diaphragm 2 on the side of the strain sensor 3 (the right side in FIG. 14), thereby the diaphragm film 21 around the strain sensor 3 becomes easy to deform. As a result, stress concentration in the diaphragm film 21 on the side opposite of the strain sensor 3 can be suppressed, thus preventing breakage of the diaphragm 2.

Embodiment 7

Figure 16:
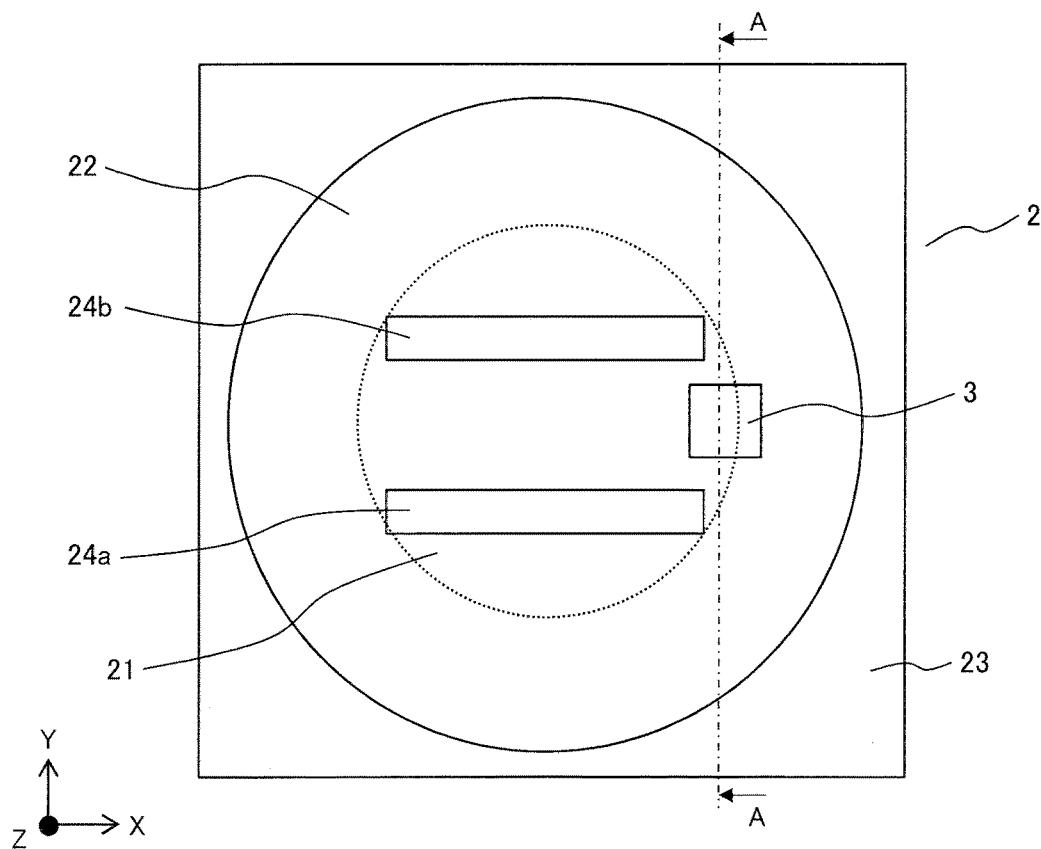
FIG. 16 is a schematic illustration showing a plan view of an exemplary diaphragm including a strain sensor according to Embodiment 7 of the invention.
Figure 17:
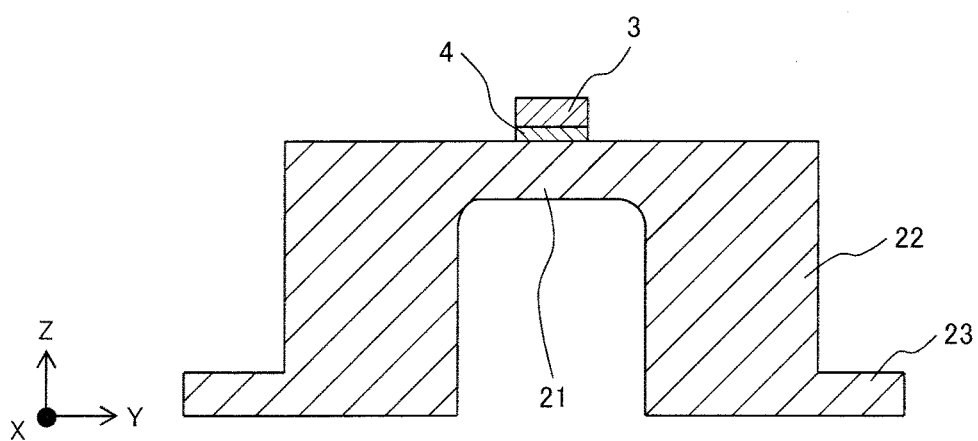
FIG. 17 is a schematic illustration showing a cross-sectional view of the diaphragm shown in FIG. 16 cut along A-A chain line.

FIGS. 16 and 17 are schematic illustrations showing a pressure sensor of Embodiment 7 of the invention. Embodiment 7 will be described with reference to main differences from Embodiment 2.

In Embodiment 7 shown in FIGS. 16 and 17, the depressions 24a and 24b are elongated grooves that do not penetrate the diaphragm film 21 and have a constant depth throughout the depressions. The groove depressions 24a and 24b extend an entire span of the diaphragm film 21 in the x-direction (extend, in the x-direction, from an edge along the perimeter of the diaphragm film 21 across the diaphragm film 21 to the corresponding opposite edge along the perimeter of the diaphragm film 21 edge). In the y-direction, the groove depressions 24a and 24b extend a relatively short distance from a position adjacent to or a certain distance apart from the strain sensor 3, which means that each of the grooves has a relatively small width. On the other hand, the groove depressions 24a and 24b do not penetrate into the top surface of the diaphragm film support 22 (that is, two corners of each groove are in contact with the perimeter of the diaphragm film 21).

This Embodiment 7 structure also provides positive effects similar to Embodiment 2.

More specifically, the groove depressions 24a and 24b (which are formed by thinning (digging down) a surface region of the diaphragm 2) allow the diaphragm film 21 to easily deform in the y-direction in response to a y-direction compression stress caused by a temperature change. Therefore, y-direction compression strains exerted on the strain sensor 3 can be decreased. As a result, the difference between the x- and y-direction strains can be decreased, thus suppressing the zero-point output deviation of the strain sensor 3 caused by a temperature change.

If the groove depressions 24a and 24b are not provided, stress concentration is prone to occur at the edge (perimeter) of the diaphragm film 21 by a stress application. In Embodiment 7, the groove depressions 24a and 24b are provided in the diaphragm film 21 without crossing the edge (perimeter) of the diaphragm film 21, and therefore, do not increase the stress concentration in the diaphragm film 21, thus preventing breakage of the diaphragm 2.

Embodiment 8

Figure 18:
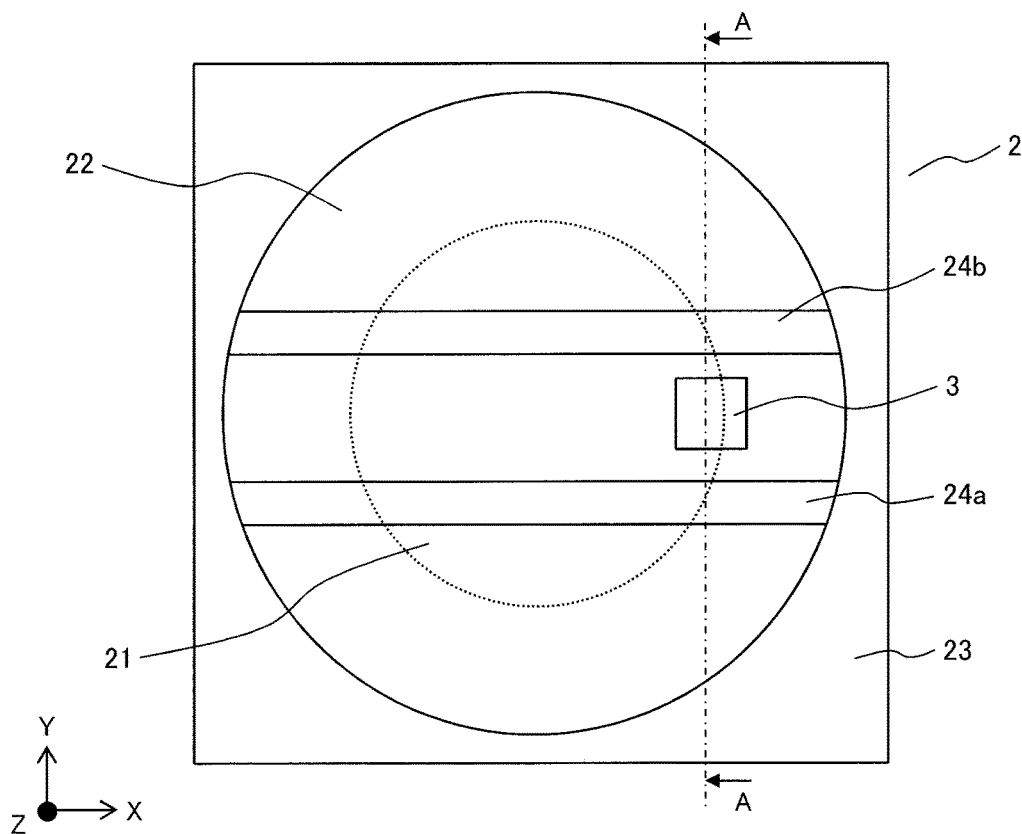
FIG. 18 is a schematic illustration showing a plan view of an exemplary diaphragm including a strain sensor according to Embodiment 8 of the invention.
Figure 19:
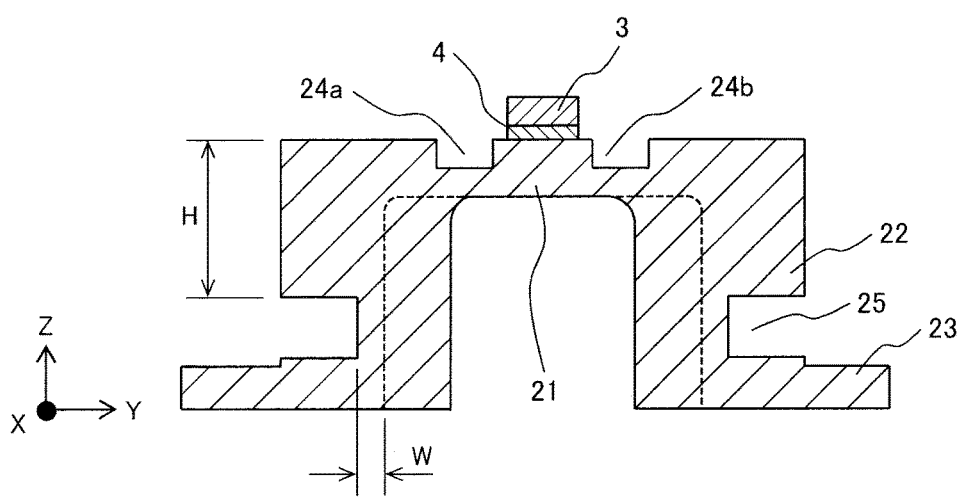
FIG. 19 is a schematic illustration showing a cross-sectional view of the diaphragm shown in FIG. 18 cut along A-A chain line.

FIGS. 18 and 19 are schematic illustrations showing a pressure sensor of Embodiment 8 of the invention. Embodiment 8 is a modification of Embodiment 3 shown in FIGS. 8 and 9, and will be described with reference to main differences from Embodiment 3.

In Embodiment 8, an outer side surface of the diaphragm film support 22 is provide with a side groove 25 which is formed above the flange 23 and along a whole periphery of the outer side surface. The other structure is the same as Embodiment 3.

The flange 23 is usually for mounting on, for example, a gas channel base (not shown). The bottom of the flange 23 is screwed with the gas channel base with an O-ring (or a metal O-ring) sandwiched therebetween in order to prevent gas leakage. The screwing operation potentially may deform the flange 23, which may then strain the diaphragm film support 22 and the diaphragm film 21. If such a strain (detected by the strain sensor 3) changes over time, the accuracy of the strain sensor 3 may degrade.

This Embodiment 8 structure also provides positive effects similar to Embodiment 3. In addition, the side groove 25 provided in the outer side surface of the diaphragm film support 22 suppresses transfer of a deformation of the flange 23 to the diaphragm film 21. Hence, even when the flange 23 is deformed by a screwing operation, transfer of the deformation of the flange 23 to the diaphragm film 21 is suppressed and therefore the strain sensor 3 does not detect any strain caused by the screwing operation. As a result, the accuracy of the strain sensor 3 is not degraded.

Embodiment 9

Figure 20:
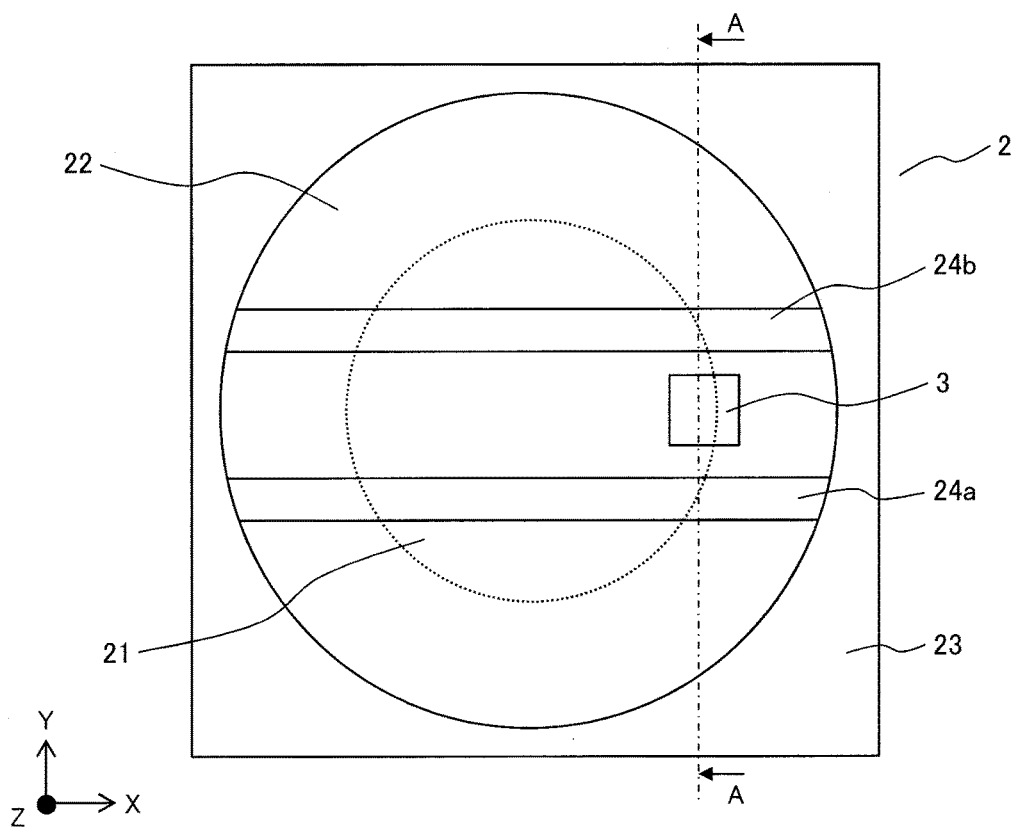
FIG. 20 is a schematic illustration showing a plan view of an exemplary diaphragm including a strain sensor according to Embodiment 9 of the invention.
Figure 21:
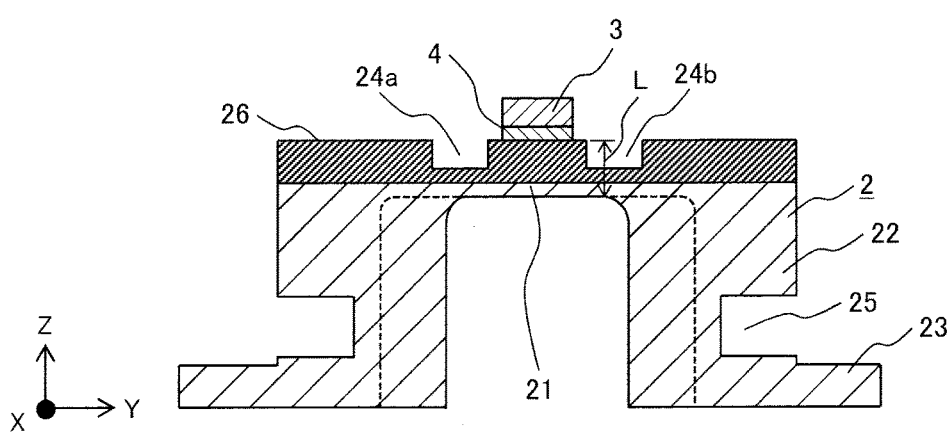
FIG. 21 is a schematic illustration showing a cross-sectional view of the diaphragm shown in FIG. 20 cut along A-A chain line.

FIGS. 20 and 21 are schematic illustrations showing a pressure sensor of Embodiment 9 of the invention. Embodiment 9 is a modification of Embodiment 8 shown in FIGS. 18 and 19, and will be described with reference to main differences from Embodiment 8.

In Embodiment 9 shown in FIGS. 20 and 21, an additional diaphragm layer 26 having a linear expansion coefficient close to that of the strain sensor 3 is formed on the top surface of the diaphragm 2. The strain sensor 3 is bonded to the additional diaphragm layer 26 by the bonding layer 4, and groove depressions 24a and 24b similar to those of Embodiment 8 are provided in a surface of the additional diaphragm layer 26.

Typically, a strong metal bonding (such as an Au/Sn eutectic bonding or Au/Ge eutectic bonding) or a glass bonding (such as V-based glass bonding) is advantageously used for bonding the strain sensor 3 made of silicon to the diaphragm 2 because of the excellent mechanical properties (such as a high creep resistance). For both types of bonding, the bonding is usually performed by melting the bonding material at 280° C. or higher. Thus, when two layers having different linear expansion coefficients are bonded by such a high temperature bonding method, a large strain is introduced in the two layers after solidification of the bonding material.

For example, when a diaphragm 2 made of good corrosion resistant SUS316L stainless steel ("SUS316L" is a code of austenitic stainless steel material specified in the Japanese Industrial Standards, which is also referred as "316L" in this specification) having a linear expansion coefficient of $15.9 \times 10^{-6}/°$ C. is bonded to a strain sensor 3 made of silicon having a linear expansion coefficient of $3.1 \times 10^{-6}/°$ C., the linear expansion coefficient difference is too large and as a result a crack may occur in the strain sensor 3 in the worst case. Even when the strain sensor 3 can be bonded to the diaphragm 2 without any crack, a temperature change causes a larger strain in the strain sensor 3 due to a heat shrinkage difference, resulting in a strain sensor 3 exhibiting a poor temperature characteristic.

This Embodiment 9 structure also provides positive effects similar to Embodiment 8. In addition, the strain sensor 3 of Embodiment 9 is bonded, via the bonding layer 4, to the additional diaphragm layer 26 having a linear expansion coefficient close to that of the strain sensor 3, and therefore, no cracks are generated in the strain sensor 3 caused by an linear expansion coefficient difference. Also, a temperature change does not cause any strain in the strain sensor 3 due to a heat shrinkage difference, resulting in a strain sensor 3 of Embodiment 9 exhibiting a good temperature characteristic.

The additional diaphragm layer 26 is most preferably made of a material having a linear expansion coefficient close to silicon, such as Kovar (registered trademark, an Ni—Co—Fe alloy) (linear expansion coefficient=about $5 \times 10^{-6}/°$ C.) and 42 Alloy (42Ni—Fe alloy) (linear expansion coefficient=about $5 \times 10^{-6}/°$ C.).

However, these materials have relatively poor corrosion resistance, and therefore are unfavorable to be exposed to corrosive gases. In order to solve this problem, a composite (two-layer) diaphragm 2 (seeing FIG. 21) is formed by bonding a low linear expansion coefficient material and corrosion resistant SUS316L that is to be exposed to corrosive environment. A thickness of the SUS316L in the diaphragm film 21 is preferably as thin as possible, and most preferably ¼ or less of the total thickness of the diaphragm film 21 (L in FIG. 21).

Although, in FIG. 21 of Embodiment 9, the additional diaphragm layer 26 is formed all over the diaphragm 2, the additional diaphragm layer 26 may be formed only below the strain sensor 3. In this case, the groove depressions 24a and 24b are formed on the surface of the diaphragm 2.

EXAMPLES

In order to verify the effect of the depressions 24a and 24b formed on the surface of the diaphragm film 21 of the invention on the sensitivity and temperature characteristic of the pressure sensor 1, finite element simulation was carried out. Next, results of the finite element simulation will be described.

The diaphragm 2 used for the computer simulation was as follows: an outer diameter of the diaphragm film support 22 was 10.0 mm; a height of the diaphragm 2 was 2.0 mm; an inner diameter of the diaphragm film support 22 was 7.6 mm; a thickness of the diaphragm film 21 was 0.25 mm; the depressions 24a and 24b were those of FIGS. 4 and 5, FIGS. 6 and 7, and FIGS. 10 and 11; a depth of the depressions 24a and 24b was 0.1 mm; and a linear expansion coefficient of the diaphragm 2 was that of Kovar (registered trademark, an Ni—Co—Fe alloy) ($5.1 \times 10^{-6}/K$).

The strain sensor 3 used for the computer simulation was as follows: a square of 2.4 mm×2.4 mm; 0.16 mm thick; a linear expansion coefficient was that of silicon ($3.0 \times 10^{-6}/K$); and its center was 2.9 mm distant from the center of the diaphragm film 21 in the x-direction.

The bonding layer 4 used for the computer simulation was follows: an area was a square of 2.4 mm×2.4 mm; a thickness was 0.01 mm; and a linear expansion coefficient was that of Au/Sn eutectic alloy ($17.5 \times 10^{-6}/K$).

The sensitivity of each of Inventive Example pressure sensors 1 having depressions 24a and 24b was estimated as follows: First, the x-direction strain ($\epsilon_x$) and the y-direction strain ($\epsilon_y$) detected by a strain sensor 3 of each the Inventive Example pressure sensor 1 were calculated. Then, the sensitivity of each the Inventive Example pressure sensor 1 was estimated by a ratio of the strain difference ($\epsilon_x-\epsilon_y$) for each the Inventive Example pressure sensor 1 relative to that for a Comparative Example pressure sensor without any depressions 24a and 24b (whose sensitivity was assigned a reference sensitivity of "1").

The temperature characteristic of each of the Inventive Example pressure sensors 1 was estimated as follows: First, for the Inventive Example pressure sensors 1 and the Comparative Example pressure sensor, the "$\epsilon_x-\epsilon_y$" was calculated at various temperatures (corresponding to temperatures during cooling from 280° C. (melting point of Au/Sn eutectic alloy) to 20° C.). Next, for the Inventive Example pressure sensors 1 and the Comparative Example pressure sensor, the change of the "$\epsilon_x-\epsilon_y$" with temperature (the "$\epsilon_x-\epsilon_y$" temperature coefficient) was calculated. Then, the temperature characteristic of each the Inventive Example pressure sensor 1 was estimated by a ratio of the "$\epsilon_x-\epsilon_y$" temperature coefficient of each the Invention Example pressure sensor 1 relative to that of the Comparative Example pressure sensor 1 (whose "$\epsilon_x-\epsilon_y$" temperature coefficient was assigned a reference temperature coefficient of "1").

The simulation results are shown in Table 1.

TABLE 1

Figure 5:
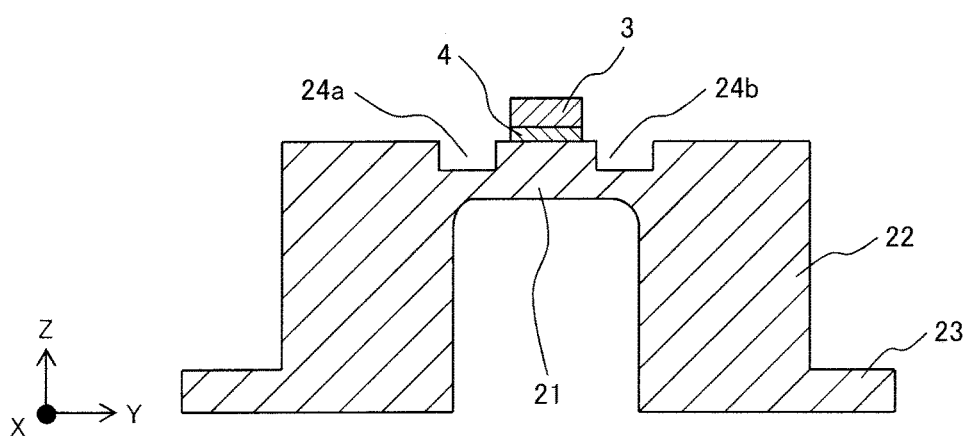
FIG. 5 is a schematic illustration showing a cross-sectional view of the diaphragm shown in FIG. 4 cut along A-A chain line.

| Depression Configuration | Sensitivity | Temperature Characteristic | |
|---|---|---|---|
| FIGS. 4 and 5 | 1.08 | 0.82 | Inventive Example 1 |
| FIGS. 6 and 7 | 1.12 | 0.81 | Inventive Example 2 |
| FIGS. 10 and 11 | 1.14 | 0.61 | Inventive Example 4 |
| Without Depressions | 1.00 | 1.00 | Comparative Example |

As shown in Table 1, the Inventive Example pressure sensors 1 having a diaphragm 2 with depressions 24a and 24b (FIGS. 4 to 7, 10 and 11) exhibit an improved sensitivity and temperature characteristic over the Comparative Example pressure sensor without any depressions 24a and 24b.

In order to prove the correctness of this computer simulation, an pressure sensor (a) of the invention was actually fabricated as follows: First, a diaphragm 2 having the above structure used for the simulation and the depressions 24a and 24b in FIGS. 8 and 9 was formed of Kovar (registered trademark, an Ni—Co—Fe alloy). Next, a strain sensor 3 having the above structure used for the simulation was mounted on the diaphragm 2 by an Au/Sn eutectic alloy bonding at the above-described position used for the simulation.

For comparison, a pressure sensor (b) having the same structure as the pressure sensor (a) but without any depressions 24a and 24b was also actually fabricated.

Nitrogen gas (500 Pa) was introduced over the diaphragm of the pressure sensors (a) and (b). The measured sensitivity of the pressure sensor (a) was 1.13 while that of the pressure sensor (b) was 1.00.

Also, the temperature coefficient of the strain sensors (a) and (b) from 5 to 60° C. was measured. The absolute value of the temperature coefficient of the pressure sensor (a) was 0.42µε/° C. while that of the pressure sensor (b) was 0.60µε/° C.

The above results demonstrate that the pressure sensor according to the invention exhibits an improved sensitivity and temperature characteristic over conventional pressure sensors.

Next, the output of the strain sensor 3 of the pressure sensor 1 of Embodiment 8 when the flange 23 is fastened to a channel base with a metal O-ring therebetween was simulated; the simulation was carried out for various diaphragm film support 22 structures. The output for the diaphragm film support 22 without any side grooves 25 was assigned a reference output of "1" in Table 2. Here, the diaphragm film support 22 without any side grooves 25 had a width (W) of 1.4 mm and a height (H) of 2.8 mm (for W and H, see FIG. 19).

TABLE 2

| Height (H) | Width (W) | Output | Dispersion |
|---|---|---|---|
| 2.8 mm | 1.4 mm (without side grooves) | 1.0 | 1.0 |
| 2.8 mm | 0.5 mm | 0.2 | 0.8 |
| 4.8 mm | 0.8 mm | 0.16 | 0.1 |
| 4.8 mm | 0.5 mm | 0.07 | 0.1 |

As is apparent from Table 2, the side grooves 25 prevent a strain caused by screwing from being transferred to the diaphragm film 21, thus decreasing the output of the strain sensor 3. The higher the height (H) is, the larger the above effect is.

There is no particular limitation on applications of the above-described pressure sensor 1 of the invention. For example, when the first material of the diaphragm 2 is a high corrosion resistant material (such as a stainless steel), the pressure sensor 1 can be advantageously used for the measurement of the pressure of highly corrosive fluids. For such application, a corrosion resistant coating may be applied to the surface of the first material exposed to corrosive fluids. Here, the underlying first material is not necessarily highly corrosion resistant (such as a stainless steel), but may be poorly corrosion resistant. Examples of the corrosion resistant coating are a metal plating layer (such as nickel and gold); a good corrosion resistant resin application layer (such as fluorocarbon resin); and a combination of these layers.

Furthermore, the pressure sensor 1 of the invention is small in size and excellent in temperature characteristics, and hence can be suitably used for pressure monitoring mass flow meters or mass flow controllers built in semiconductor manufacturing equipment.

The invention is not limited to the above described embodiments, and various modifications may be made. Also, the above embodiments are given for the purpose of detailed illustration and explanation only, and the invention is not intended to include all features and aspects of the embodiments described above. Also, a part of an embodiment may be replaced by one or more parts of the other embodiments, or added with one or more parts of the other embodiments. Also, a part of an embodiment may be removed, or replaced by one or more parts of the other embodiments, or added with one or more parts of the other embodiments.

LEGEND

1 . . . pressure sensor; 2 . . . diaphragm; 3 . . . strain sensor; 4 . . . bonding layer; 5 . . . fluid-tight housing; 6 . . . fluid-tight space; 7a, 7b, 7c and 7d . . . strain gauge; 21 . . . diaphragm film; 22 . . . diaphragm film support; 23 . . . flange; 24, 24a and 24b . . . depression; 25 . . . side groove; and 26 . . . additional diaphragm layer.

The invention claimed is:

1. A pressure sensor comprising:
a diaphragm made of a first material and having an inside surface facing to a fluid-tight space, the diaphragm including
a diaphragm film deformable in response to a pressure application, the diaphragm film having an inside surface that is part of the inside surface of the diaphragm, and
a diaphragm film support having an inside surface that is part of the inside surface of the diaphragm and constitutes a periphery of the inside surface of the diaphragm film;
a strain sensor bonded to the inside surface of the diaphragm by a bonding material such that a part of the strain sensor lies on the inside surface of the diaphragm film support, the strain sensor being made of a second material;
a plurality of strain gauges provided on the strain sensor, wherein defining a direction oriented from a center of the inside surface of the diaphragm to a position bonded of the strain sensor as an x-direction and another direction perpendicular to the x-direction on the inside surface of the diaphragm as a y-direction, the strain sensor has, on a central region of its surface, a bridge circuit consisting of four strain gauges, one pair on two opposite sides of the four strain gauges being disposed in such a manner that current flows through them in the x-direction, and the other pair on two other opposite sides of the four strain gauges being disposed in such a manner that current flows through them in the y-direction; and
a depression formed on the inside surface of at least the diaphragm film, wherein the depression extends a certain length in the y-direction, and the depression is adjacent to or a certain distance apart from an edge of the strain sensor in the y-direction.

2. The pressure sensor according to claim 1, wherein:
the plurality of strain gauges are provided around a central region of the strain sensor;
and the central region of the strain sensor is positioned at the periphery region of the inside surface of the diaphragm film.

3. The pressure sensor according to claim 1, wherein:
the depression includes at least two depressions that are disposed so as to sandwich the strain sensor in the y-direction.

4. The pressure sensor according to claim 3, wherein:
each of the at least two depressions does not penetrate the diaphragm film;
each of the at least two depressions overlaps with at least part of the diaphragm film;
each of the at least two depressions has almost the same length in the x-direction as the strain sensor;
each of the at least two depressions is disposed parallel to and at almost the same position as the strain sensor in the x-direction; and
each of the at least two depressions does not extend to an outer perimeter of the inside surface of the diaphragm.

5. The pressure sensor according to claim 3, wherein:
each of the at least two depressions does not penetrate the diaphragm film;
each of the at least two depressions overlaps with at least part of the diaphragm film;
each of the at least two depressions is has a longer length in the x-direction than the strain sensor;
each of the at least two depressions is disposed parallel to the strain sensor in the x-direction and extends from an x-direction position of an outer edge of the strain sensor to a position on the opposite side in the x-direction across a central region of the inside surface of the diaphragm; and
each of the at least two depressions does not extend to an outer perimeter of the inside surface of the diaphragm.

6. The pressure sensor according to claim 3, wherein:
each of the at least two depressions does not penetrate the diaphragm film;
each of the at least two depressions overlaps with at least part of the diaphragm film;
each of the at least two depressions is disposed parallel to the strain sensor in the x-direction and extends from an outer perimeter of the inside surface of the diaphragm across a central region of the inside surface of the diaphragm to the opposite side outer perimeter of the inside surface of the diaphragm in the x-direction; and
each of the at least two depressions does not extend to an outer perimeter of the inside surface of the diaphragm in the y-direction.

7. The pressure sensor according to claim 3, wherein:
each of the at least two depressions does not penetrate the diaphragm film;
each of the at least two depressions is disposed parallel to the strain sensor in the x-direction and extends from an outer perimeter of the inside surface of the diaphragm across a central region of the inside surface of the diaphragm to the opposite side outer perimeter of the inside surface of the diaphragm in the x-direction; and
each of the at least two depressions extends to an outer perimeter of the inside surface of the diaphragm in the y-direction.

8. The pressure sensor according to claim 3, wherein:
each of the at least two depressions does not penetrate the diaphragm film;
each of the at least two depressions is formed with a constant depth;
each of the at least two depressions is disposed parallel to the strain sensor in the x-direction and extends from an outer perimeter of the inside surface of the diaphragm across a central region of the inside surface of the diaphragm to the opposite side outer perimeter of the inside surface of the diaphragm in the x-direction; and
each of the at least two depressions extends from the edge of the strain sensor in the y-direction to an outer perimeter of the inside surface of the diaphragm in the y-direction.

9. The pressure sensor according to claim 3, wherein:
each of the at least two depressions does not penetrate the diaphragm film;
each of the at least two depressions overlaps with at least part of the diaphragm film;
each of the at least two depressions is has a longer length in the x-direction than the strain sensor;
each of the at least two depressions is disposed parallel to the strain sensor in the x-direction and extends from an outer perimeter of the inside surface of the diaphragm to a central region of the inside surface of the diaphragm in the x-direction; and
each of the at least two depressions extends to an outer perimeter of the inside surface of the diaphragm in the y-direction.

10. The pressure sensor according to claim 3, wherein:
each of the at least two depressions does not penetrate the diaphragm film;

each of the at least two depressions is formed on only the inside surface of the diaphragm film; and each of the at least two depressions is disposed parallel to the strain sensor in the x-direction and extends from a border of the inside surface of the diaphragm film across a central region of the inside surface of the diaphragm film to the opposite side border of the inside surface of the diaphragm film in the x-direction.

11. The pressure sensor according to claim 1, wherein:
the first material is a metal; and
the second material is silicon.

12. The pressure sensor according to claim 11, wherein:
the metal of the diaphragm is a 316L stainless steel.

13. The pressure sensor according to claim 1, wherein:
the bonding material is an Au/Sn eutectic alloy, an Au/Ge eutectic alloy, or a low melting-point vanadium-based glass.

14. The pressure sensor according to claim 1 further comprising:
a fluid-tight housing; and
a flange provided at bottom of the diaphragm for fixing another member for pressure measurement, wherein the flange is secured to the fluid-tight housing in such a way that the fluid-tight space is formed by being surrounded by the fluid-tight housing and the diaphragm, and that the fluid-tight space maintains a constant pressure.

15. The pressure sensor according to claim 1, wherein:
the diaphragm film support has a groove on a side surface exposed to a fluid-tight space, the groove being formed along a whole periphery of the side surface and disposed above the flange.

16. The pressure sensor according to claim 1, further comprising:
an additional diaphragm layer having a linear expansion coefficient close to the linear expansion coefficient of the strain sensor, the strain sensor being bonded to the diaphragm via the additional diaphragm layer.

17. The pressure sensor according to claim 16, wherein:
the depression is formed on a surface of the additional diaphragm layer.

18. The pressure sensor according to claim 16, wherein:
the additional diaphragm layer is made of a predetermined Ni—Co—Fe alloy or 42Ni—Fe alloy.

19. A pressure sensor comprising:
a diaphragm made of a first material and having an inside surface facing to a fluid-tight space, the diaphragm including
a diaphragm film deformable in response to a pressure application, the diaphragm film having an inside surface that is part of the inside surface of the diaphragm, and
a diaphragm film support having an inside surface that is part of the inside surface of the diaphragm and constitutes a periphery of the inside surface of the diaphragm film;
a strain sensor bonded to the inside surface of the diaphragm by a bonding material such that a part of the strain sensor lies on the inside surface of the diaphragm film support,
the strain sensor being made of a second material;
a plurality of strain gauges provided on the strain sensor;
a depression formed on the inside surface of the diaphragm, wherein defining a direction oriented from center of the inside surface of the diaphragm to a position bonded of the strain sensor as an x-direction and another direction perpendicular to the x-direction on the inside surface of the diaphragm as a y-direction, the depression extends a certain length in the y-direction, and the depression is adjacent to or a certain distance apart from an edge of the strain sensor in the y-direction; and
an additional diaphragm layer having a linear expansion coefficient close to the linear expansion coefficient of the strain sensor, the strain sensor being bonded to the diaphragm via the additional diaphragm layer.

* * * * *